Patented June 27, 1950

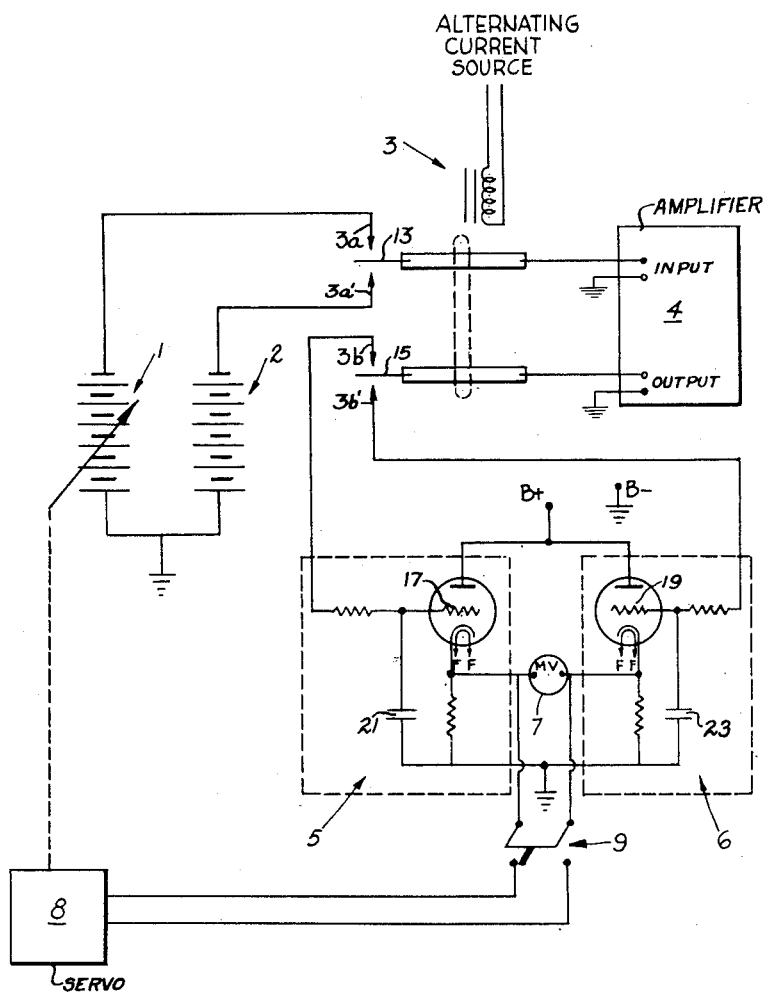

2,512,702

UNITED STATES PATENT OFFICE 2,512,702

NULL INDICATOR

Roby Byron White, Jr., United States Navy

Application May 22, 1946, Serial No. 671,489

6 Claims. (Cl. 171—95)

(Granted under the act of March 3, 1883, as amended April 30, 1928; 370 O. G. 757)

This invention relates in general to electronic calibration equipment and in particular to a means for effecting a balance or equality between direct voltages.

An object of this invention is to provide a means of effecting, with a high degree of accuracy, a balance or equality between direct voltages of any reasonable magnitude.

Another object is to provide an inexpensive and readily constructed apparatus for effecting, with a high degree of accuracy, a balance or equality between direct voltages of any reasonable magnitude.

A further object is to provide a highly accurate means of effecting a balance of equality between direct voltages over a wide range of potentials.

Further objects and advantages of this invention, as well as its construction, arrangement, and operation, will be apparent from the following description and claims in connection with the accompanying drawing, which is a schematic wiring diagram of one form of this invention showing two direct-voltage sources 1 and 2 of which the voltages are to be balanced, a double-pole, double-throw, alternating-current operated vibrator 3, an alternating-current amplifier 4 which need not have a wide frequency range, parallel cathode followers generally designated as 5 and 6, a zero-center null-indicating direct-current instrument 7, and a servo system generally designated 8.

In operation, on upward movement of contacting members 13, 15, the contacts 3a and 3b of the vibrator are closed connecting the direct voltage of source 1 to the input of the amplifier 4, and the output of amplifier 4 to the grid 17 of cathode follower 5. Alternately on downward movement of the contacting members 13, 15, the contacts 3a' and 3b' are closed connecting the direct voltage of source 2 to the input of amplifier 4 and the output of amplifier 4 to the grid 19 of cathode follower 6.

A difference between voltages 1 and 2 is, therefore, effective to cause a pulsating input to amplifier 4; the alternating component of which is amplified by amplifier 4 and rectified by contacts 3b and 3b' one half of the cycle being applied to one cathode follower and the other half being applied to the other cathode follower.

The potential difference between the grids of the cathode follower is, therefore, the amplified unbalance between voltages 1 and 2, so that the reading of meter 7 is proportional to the unbalance between voltages 1 and 2. Thus when meter 7 indicates a null, the voltages 1 and 2 are balanced.

The cathode follower is a conventional type of direct-coupled power-amplifying circuit. Although the power is amplified, the output voltage is slightly less than the input voltage, so as higher input voltage is required than would be required for a plate-coupled amplifier; therefore, the error due to the contact voltage of contact 3b is reduced.

Direct-coupled amplifiers have no low-frequency cutoff and may be used to amplify voltage or power from a source of direct voltage. Therefore, by using cathode followers 5 and 6 in connection with rectifying contacts 3b and 3b' as described above, errors caused by undesired alternating voltages picked up by amplifier 4 are eliminated.

Further, as shown in the drawing, grids 17 and 19 are connected to ground through condensers 21, 23, respectively, which, during the interval when the grid of the respective stage is essentially floating free, that is, when no signal is applied thereto, tends to maintain the corresponding grids at predetermined potentials above ground. Accordingly, the cathode followers, as herein employed operate as integrating devices.

If the voltage of source 1 is to be balanced to that of source 2, the adjustment may be made by manual adjustment of voltage 1, or, by closing switch 9, the adjustment may be made automatically by means of servo system 8. As used herein, the term "servo system" refers to an apparatus by means of which a small amount of power applied to the apparatus controls a larger amount of power applied to a shaft. When switch 9 is closed, the unbalanced voltage between cathode followers 5 and 6 is applied to the input of the servo system causing an electric motor (part of the servo system) to rotate in a direction determined by the polarity of the unbalance between cathode followers 5 and 6. This motor drives mechanism to bring the voltage of source 1 closer in magnitude to that of source 2.

It is understood that the improvement in accuracy is directly proportional to the amplification, the limit of accuracy being about 10 microvolts unbalance between the voltages 1 and 2. The amplifier should, therefore, have a gain control so that first a rough adjustment and then a fine adjustment can be made.

Direct voltage is defined as voltage of unipolarity, commonly referred to as D. C. or direct current voltage. Similarly, alternating voltage as here used is commonly referred to as A. C. or alternating current voltage.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. The method of ascertaining a balance condition between direct voltages, wherein an amplifier and a pair of parallel-connected cathode follower stages are employed, said method comprising alternately applying said voltages to the input of the amplifier, applying the output of said amplifier synchronously to individual ones of the parallel cathode followers, and measuring the unbalance between the outputs of the cathode followers.

2. An apparatus for effecting a balance between direct voltages, comprising an alternating-current amplifier, integrating means including a pair of cathode follower stages, means adapted rapidly to apply each of said voltages alternately to the input of said amplifier and for alternately applying the output of said amplifier synchronously to the input of individual ones of said cathode followers, and means to measure the unbalance between said cathode followers.

3. The apparatus as in claim 2, wherein said voltage-applying means comprises an electromagnetic switching device and a source of alternating current for actuating said device.

4. The apparatus as in claim 2, wherein said voltage-applying means comprises an electromagnetic switching device having conjointly operable contacting members, one said member being coupled to the input of said amplifier, the other said member being coupled to the output of said amplifier, each said member being mounted for vibratory movement between individual pairs of contacts respectively connected to sources of voltages to be balanced and said cathode followers.

5. Electric test apparatus comprising a source of unknown voltage; a source of standard voltage; an amplifier including a voltage amplifier part and a cathode follower part, said cathode follower part comprising a pair of electron discharge tubes, each having cathode and grid electrodes, said cathode electrodes being connected through respective cathode resistors to the ground, and means coupled to said grid electrodes for maintaining the potential thereof substantially constant during periods of no-signal; switch means connecting said voltage sources to said amplifier with the amplified voltage output corresponding to said unkown and said standard voltages applied to respective grid electrodes of said tubes; and means connected between said cathode electrodes for indicating the differential output of said cathode follower part.

6. Electric test apparatus comprising a source of unknown unidirectional voltage; a source of standard unidirectional voltage; an amplifier including a voltage amplifier part and a cathode follower part, said cathode follower part comprising a pair of electron discharge tubes, each having cathode, grid, and anode electrodes, said anode electrodes being connected to one another and to a positive potential supply, said cathode electrodes being connected through respective cathode resistors to the ground, and means coupled to said grid electrodes for maintaining the potential thereof substantially constant during periods of no-signal, whereby said electron discharge tubes operate as integrating devices; vibratory switch means connecting said voltage sources to said amplifier with the amplified voltage output corresponding to said unknown and said standard voltages applied synchronously to respective grid electrodes of said tubes; and voltage indicating means connected between said cathode electrodes for indicating the differential output of said cathode follower part.

ROBY BYRON WHITE, JR.

REFERENCES CITED

The following references are of record in the file of this patent:

UNITED STATES PATENTS

| Number | Name | Date |
|---|---|---|
| 2,323,128 | Hare | June 29, 1943 |
| 2,367,746 | Williams | Jan. 23, 1945 |
| 2,419,607 | Terry | Apr. 29, 1947 |